(12) United States Patent
Herrmann et al.

(10) Patent No.: US 9,346,224 B2
(45) Date of Patent: May 24, 2016

(54) METHOD AND APPARATUS FOR TRANSFERRING OBJECTS BETWEEN TWO CONSECUTIVE PROCESSING STATIONS BEING OPERATED WITH DIFFERENT CYCLE SPEEDS

(71) Applicant: Novartis AG, Basel (CH)

(72) Inventors: Swen Herrmann, Hornberg (DE); Roger Biel, Aschaffenburg (DE); Harald Schott, Goldbach (DE)

(73) Assignee: NOVARTIS AG, Basel (CH)

( * ) Notice: Subject to any disclaimer, the term of this patent is extended or adjusted under 35 U.S.C. 154(b) by 0 days.

(21) Appl. No.: 14/818,570

(22) Filed: Aug. 5, 2015

(65) Prior Publication Data

US 2015/0336339 A1 Nov. 26, 2015

Related U.S. Application Data

(62) Division of application No. 13/328,806, filed on Dec. 16, 2011, now Pat. No. 9,102,109.

(60) Provisional application No. 61/423,634, filed on Dec. 16, 2010.

(51) Int. Cl.
*B65G 53/40* (2006.01)
*B29D 11/00* (2006.01)
*B65G 51/00* (2006.01)

(52) U.S. Cl.
CPC ............ *B29D 11/0023* (2013.01); *B65G 51/00* (2013.01)

(58) Field of Classification Search
USPC ............. 406/28, 31, 176, 197, 109, 110, 111, 406/112; 198/575, 576, 577, 579, 602; 414/797
See application file for complete search history.

(56) References Cited

U.S. PATENT DOCUMENTS 5,054,984 A   10/1991  Chan
5,528,878 A * 6/1996   Edwards ............... B65B 25/008
                                                        53/495

(Continued)

FOREIGN PATENT DOCUMENTS

WO        9842497 A2    10/1998
WO     2008116856 A1    10/2008
WO     2010100543 A2     9/2010

OTHER PUBLICATIONS

PCT International Search Report dated Apr. 24, 2012, International Application No. PCT/EP2011/073053, International Filing Date Dec. 16, 2011.

(Continued)

*Primary Examiner* — Joseph Dillon, Jr.
(74) *Attorney, Agent, or Firm* — Robert A. Ambrose

(57) ABSTRACT

A method for transferring objects such as ophthalmic lenses or contact lenses between two consecutive processing stations, particularly processing stations having differing cycle times or cycle speeds is disclosed, including removing the objects from a preceding processing station, in which the objects are advanced with a first cycle speed, transporting the removed objects to a subsequent processing station including a plurality of consecutively arranged receptacles (1-10), which are advanced through the subsequent processing station with a second cycle speed faster than the first cycle speed. The objects may be transported via at least one feed tube (12, 13), each feed tube ending in a respective transfer nozzle (14, 15) which is arranged in vicinity of a corresponding one of the receptacles (1-10) and which is aligned with an inlet of the receptacle (4, 5; 4, 6). The respective transfer nozzles (14, 15) are capable of being moved synchronously with and in the direction of advancement of corresponding receptacle.

8 Claims, 2 Drawing Sheets

(56) References Cited

U.S. PATENT DOCUMENTS

| | | | | |
|---|---|---|---|---|
| 5,540,543 A * | 7/1996 | Lust | ................... | B29C 31/006 414/225.01 |
| 5,578,331 A * | 11/1996 | Martin | ............... | B29D 11/0024 134/66 |
| 5,607,642 A * | 3/1997 | Lepper | ................. | B65B 25/008 198/340 |
| 5,649,410 A * | 7/1997 | Martin | ............... | B29D 11/0024 134/901 |
| 5,681,138 A * | 10/1997 | Lust | ................... | B29C 31/006 198/409 |
| 5,749,205 A * | 5/1998 | Edwards | ............... | B65B 25/008 198/429 |
| 5,829,222 A * | 11/1998 | Schlagel | ............... | B65B 25/008 198/429 |
| 5,891,371 A * | 4/1999 | Lepper | ................. | B65B 25/008 198/340 |
| 5,895,192 A * | 4/1999 | Parnell, Sr. | ........... | B29C 31/006 198/409 |
| 5,934,866 A * | 8/1999 | Redden | ................. | B65H 1/025 198/577 |
| 5,942,188 A * | 8/1999 | Lepper | ................. | B65B 22/008 198/340 |
| 5,980,184 A * | 11/1999 | Lust | ................... | B29C 31/006 414/226.01 |
| 6,077,031 A * | 6/2000 | Lust | ................... | B29C 31/006 414/800 |
| 6,079,940 A * | 6/2000 | Lust | ................... | B29C 31/006 414/752.1 |
| 6,176,669 B1 * | 1/2001 | Lust | ................... | B29C 31/006 414/226.01 |
| 6,186,736 B1 * | 2/2001 | Lust | ................... | B29C 31/006 414/800 |
| 6,260,695 B1 * | 7/2001 | Tasber | ................. | B65B 25/008 206/499 |
| 6,387,441 B1 * | 5/2002 | Yang | ....................... | B05C 3/09 118/423 |
| 6,752,581 B1 * | 6/2004 | Lust | ................... | B29C 31/006 198/468.4 |
| 6,836,692 B2 * | 12/2004 | Leavitt | ..................... | B65B 5/04 53/498 |
| 6,881,269 B2 | 4/2005 | Matsuzawa | | |
| 7,597,528 B2 | 10/2009 | Rodi | | |
| 7,682,532 B2 | 3/2010 | Hagmann | | |
| 7,789,266 B2 | 9/2010 | Biel | | |
| 7,973,915 B2 | 7/2011 | Lässig | | |
| 8,033,761 B2 | 10/2011 | Biel | | |
| 8,037,996 B2 | 10/2011 | Cheng | | |
| 8,146,611 B2 | 4/2012 | Biel | | |
| 8,240,458 B2 | 8/2012 | Keller | | |
| 8,474,653 B2 | 7/2013 | Biel | | |
| 8,505,710 B2 | 8/2013 | Egerer | | |
| 8,590,690 B2 | 11/2013 | Benz | | |
| 8,651,774 B2 | 2/2014 | Biel | | |
| 2002/0009217 A1 | 1/2002 | Bickert | | |
| 2003/0000805 A1 * | 1/2003 | Wild | ................... | B65G 47/907 198/433 |
| 2003/0031540 A1 * | 2/2003 | Leavitt | ..................... | B65B 5/04 414/222.01 |
| 2003/0185662 A1 * | 10/2003 | Appleton | ......... | B29D 11/00125 414/754 |
| 2005/0265815 A1 * | 12/2005 | Rodi | ...................... | B65G 47/82 414/788.1 |
| 2008/0124205 A1 | 5/2008 | Biel | | |
| 2008/0240890 A1 * | 10/2008 | Biel | ................... | B29D 11/0023 414/222.01 |
| 2010/0129181 A1 * | 5/2010 | Blasiak | .................. | B25J 13/087 414/4 |
| 2010/0316476 A1 * | 12/2010 | Biel | ................... | B29D 11/0024 414/627 |
| 2010/0316481 A1 * | 12/2010 | Yamamoto | ............... | G02B 7/02 414/806 |
| 2011/0091643 A1 | 4/2011 | Biel | | |
| 2013/0148076 A1 * | 6/2013 | Straub | ................ | B29D 11/0024 351/159.01 |
| 2014/0092395 A1 | 4/2014 | Fechner | | |
| 2014/0161542 A1 | 6/2014 | Biel | | |
| 2015/0053530 A1 * | 2/2015 | Schneider | .............. | B65G 37/02 198/347.1 |
| 2015/0071755 A1 * | 3/2015 | Biel | ...................... | B25J 15/0666 414/800 |

OTHER PUBLICATIONS

PCT Written Opinion of the International Searching Authority dated Apr. 24, 2012, International Application No. PCT/EP2011/073053, International Filing Date Dec. 16, 2011.

* cited by examiner

METHOD AND APPARATUS FOR TRANSFERRING OBJECTS BETWEEN TWO CONSECUTIVE PROCESSING STATIONS BEING OPERATED WITH DIFFERENT CYCLE SPEEDS

This application is a Divisional of U.S. patent application Ser. No. 13/328,806, filed Dec. 16, 2011, which claims the benefits under 35 USC 119(e) of U.S. provisional application Ser. No. 61/423,634 filed on Dec. 16, 2010, the contents of each of which are incorporated herein by reference in their entireties.

FIELD

The present invention relates to a method and a device for transferring objects, in particular ophthalmic lenses, more specifically contact lenses, between two consecutive processing stations being operated with different cycle speeds.

BACKGROUND

The mass manufacture of products has been structured and sub-divided into individual process steps. For the manufacture of the products the unfinished products must be transported from one processing station to the next one, and so on. In some automated manufacturing processes, the unfinished products are transported from one processing station to the next one in a cyclic manner, in which consecutive processing stations are synchronized with each other.

An example for a fully automated mass manufacturing process is the mass production of ophthalmic lenses, in particular contact lenses. The manufacture of such lenses can be performed in a closed loop process. One example for a cyclic closed loop process for the manufacture of contact lenses is described, for example, in WO 98/42497. The contact lenses are manufactured with reusable molds, comprising male and female mold halves. In a first processing station the female mold halves are filled with a starting material, e.g. a prepolymer solution, and the molds are closed with the corresponding male mold halves. In the next processing station, the starting material within the molds is polymerized and/or crosslinked by irradiation with e.g. ultraviolet radiation. After the polymerization and/or crosslinking step in a next processing station the mold halves are opened and the formed contact lenses are removed from the male or female mold halves in order to transport them to further processing stations.

Depending on the starting materials from which the contact lenses are made the contact lenses must be subjected to further treatment, e.g. they must be immersed in extraction liquids and/or additional treatment liquids in order to obtain contact lenses which may be worn by the user. For a variety of reasons the cycle times of the contact lens forming process steps on one hand, and the cycle times of the extraction and/or other treatment steps on the other hand, require specific processing times in order to obtain contact lenses which are in conformance with predefined specifications. Further depending on how the contact lens forming process is realized in terms of apparatus features, it may be preferable to chose a first cycle speed for the contact lens forming steps which is different from a second cycle speed that may be preferable for the extraction and/or other treatment steps. A change of the cycle speed in any of the two processes (contact lens forming process, contact lens treatment process) in order to arrive at a uniform cycle speed of the entire process would result in very expensive changes to the apparatus concept and would necessarily result in a new qualification and validation process for the manufacturing line based on this apparatus concept.

The problems at the interface of consecutive processing stations having different cycle speeds have been illustrated by way of example with respect to the mass production of ophthalmic lenses, in particular contact lenses. It is apparent for the skilled artisan, though, that such problems may occur in various kinds of fully automated manufacturing processes, which require a transfer of objects between two consecutive processing stations having different cycle speeds. Thus, while the described problem and the solution to this problem suggested by the present invention is particularly applicable in the art of manufacture of ophthalmic lenses, in particular contact lenses, it is not limited to this field of application.

It is therefore an object of the present invention to provide a solution to the addressed problems of the prior art. A method and an apparatus for transferring objects, in particular ophthalmic lenses, more specifically contact lenses, shall be provided which allows to suggest or maintain an apparatus concept that is based on different cycle speeds but which may be otherwise preferable for the specific process steps to be performed. In particular, a new qualification and validation process for a production line based on such apparatus concept should be avoided.

SUMMARY

Accordingly, one aspect of the present invention relates to a method for transferring objects such as ophthalmic lenses or contact lenses between two consecutive processing stations which are operated at different cycle speeds. This method includes the steps of:

removing the objects from a preceding processing station of the two consecutive processing stations, the objects being advanced in the preceding processing station with a first cycle speed, transporting the removed objects to a subsequent processing station of the two consecutive processing stations, the subsequent processing station including a plurality of consecutively arranged receptacles for receiving the objects, the receptacles being advanced through the subsequent processing station with a second cycle speed faster than that first cycle speed.

Another aspect of the invention relates to an apparatus for transferring objects (e.g. ophthalmic lenses such as contact lenses) between two consecutive processing stations being operated with different cycle speeds, the apparatus including a transfer device to transport the removed ophthalmic lenses to a subsequent processing station of the two consecutive processing stations and for introducing them into a plurality of receptacles consecutively arranged in the subsequent processing station, the receptacles being advanced through the subsequent processing station with a second cycle speed faster than the first cycle speed, the transfer device capable of being moved synchronously with and in the direction of advancement of the receptacles in the subsequent processing station, and the transfer device further including at least one feed tube having an entry port which is aligned with a respective removal position of the ophthalmic lenses in the preceding processing station, each feed tube ending in a respective transfer nozzle which is arranged in the vicinity of a corresponding one of the receptacles in the subsequent processing station and which is aligned with an inlet of the corresponding receptacle for introduction of the ophthalmic lens into the corresponding one of the receptacles, the respective transfer nozzle being mounted on a slide movably arranged in a frame in a manner such that the respective transfer nozzle is capable of being moved synchronously with and in the direction of advancement of the receptacles.

In embodiments, the transfer device includes at least one feed tube ending in a transfer nozzle arranged in the vicinity of a corresponding receptacle and aligned with the receptacle's inlet introduction of the lens into the receptacle. The transfer nozzle is moved synchronously with and in the direction of advancement of the receptacle and the lens is transferred into the receptacle during advancement of the receptacle. The lens transfer may be controlled by an electronic control unit connected to the preceding and subsequent processing stations. The preceding station may be a removal station of a contact lens forming line.

BRIEF DESCRIPTION OF THE DRAWINGS

These and still further aspects and advantages of the invention will become apparent from the following description of exemplary embodiments of the method and apparatus according to the invention, reference being made to the schematic drawings which are not to scale, in which.

DETAILED DESCRIPTION OF EMBODIMENTS

Figure 1:
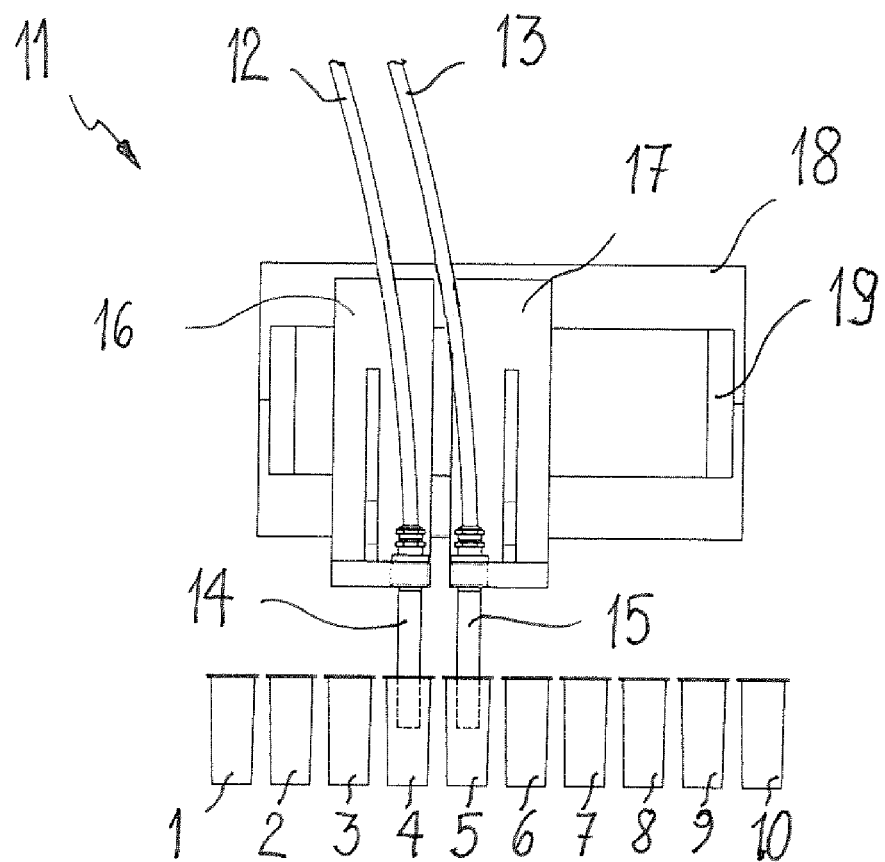
FIG. 1 is a side view of a first embodiment of a device according to the invention.

The following description of exemplary embodiments of the invention is for illustrative purposes only and is not intended to limit of the scope of the invention.

In one embodiment of the method, the transfer device includes at least one feed tube ending in a respective transfer nozzle which is arranged in the vicinity of a corresponding one of the receptacles and is aligned with an inlet of the corresponding receptacle. The respective transfer nozzle is moved synchronously with and in the direction of advancement of the corresponding receptacle in case the object is transferred into the corresponding receptacle during advancement of the receptacle.

Because the two consecutive processing stations are operated at different (unsynchronized) cycle speeds it may occur that a receptacle in the subsequent processing station is advanced exactly in that moment when an object should be transferred. Generally, the transfer device can be embodied as any particular device suitable to perform the transfer of the object. For example, the transfer device can be a conventional gripper known to those skilled in the field which may grip the object, e.g. a contact lens, at the preceding processing station and can transfer the object into the receptacle in the subsequent processing station. However, in one particular embodiment the transfer is performed with the aid of the aforementioned feed tube. By having the feed tube end in a transfer nozzle arranged in vicinity of a corresponding receptacle and aligned with the receptacle, and by this transfer nozzle being capable of being moved synchronously with and in the direction of advancement of the receptacle, a transfer of the object may be accomplished even if the receptacle is advanced at the time the transfer of the object is to occur. The same holds for the gripper or any other suitable transfer device which must be able to follow the movement of the receptacle in case the transfer of the object occurs during movement of the receptacle. Thus, the movable transfer nozzle (or the gripper or other transfer device) has the function of a synchronization buffer between the preceding processing station which is operated at a slower cycle speed and the subsequent processing station which is operated at a faster cycle speed. In a process for the manufacturing of contact lenses, this allows to take account of the physical and chemical properties of the starting materials used to make the contact lenses, and in particular allows that the contact lens forming process and the rinsing and/or extraction and/or coating process be performed at different cycle speeds so that an existing qualified and validated apparatus concept need not be changed.

In another embodiment of the method, transferring the objects is controlled by an electronic control unit which is connected with the preceding processing station and with the subsequent processing station. With the aid of this electronic control unit the moving or movements of the transfer device, for example the transfer nozzle is controlled. The electronic control unit receives information about the status of the preceding processing station as well as about that of the subsequent processing station. It controls the movement of the transfer device and has information about its current position. Taking account of all this information the electronic control unit causes the required change of the position of the transfer device (if necessary) and initiates the transfer of the object.

In a further embodiment of the method, a predetermined amount of time ahead of (prior to) the actual transfer, preferably between about 0.5 to 5 seconds ahead of the actual transfer, the preceding processing station sends a request signal to the electronic control unit that a transfer of one or more of the objects is about to occur, whereupon the electronic control unit causes the transfer nozzle to be aligned with the next or the second-next empty receptacle in the subsequent processing station. After alignment of the transfer nozzle with the next or the second-next empty receptacle the electronic control unit sends an enable signal to the preceding processing station, whereupon the object is transferred into the next or the second-next receptacle.

In a further embodiment of the method, the decision whether to align the transfer nozzle with the next or the second-next empty receptacle is made based upon a detection of the relative position of the transfer nozzle with respect to the entire distance the transfer nozzle can be moved in the direction of advancement of the receptacles, and further based upon a comparison of the distance the transfer nozzle is positioned away from the end of the entire distance with that distance the transfer nozzle must be capable of being moved synchronously with and in the direction of advancement of the receptacle.

As mentioned, the method may be applied to various automated manufacturing processes and objects to be manufactured. However, a particularly suitable application of the method is the manufacturing of ophthalmic lenses, in particular contact lenses. Due to the properties of the starting materials used to make the contact lenses, the process steps of forming of the contact lenses from the starting materials in contact lens molds are preferably performed at a slower cycle speed than the subsequent processing steps.

In another particular embodiment of the method the preceding processing station is a removal station of a contact lens forming line operated at the first cycle speed. In this contact lens forming line contact lenses are formed in contact lens molds including male and female mold halves. The male and female mold halves are arranged opened in the removal station with each formed contact lens resting on one of the male and female mold halves. The subsequent processing station to which the contact lenses are transferred, is a processing station of a contact lens treatment line operated at the second cycle speed. As mentioned, the treatment may include immersing the lens in an extraction liquid, and may alternatively or in addition include other kinds of contact lens treatments as well.

In a further embodiment of the method each of the contact lenses is removed from one of the male and female mold halves, respectively, by lifting it off by applying a fluid, e.g. air or water. The contact lens is then transported through the feed tube and the transfer nozzle into the receptacle in the processing station of the contact lens treatment line.

In a further embodiment of the method one or more male mold halves of one or more preceding molds and one or more female mold halves of one or more subsequent molds are arranged in the removal station at the same time. Or vice versa, one or more female mold halves of one or more preceding molds and one or more male mold halves of one or more subsequent molds are arranged in the removal station at the same time. The fluid is simultaneously applied to the male and the female mold halves arranged at the same time in the removal station of the contact lens forming line so as to lift off the contact lens from the male mold half and/or the female mold half, respectively, and to transport each of the contact lenses through one feed tube of a pair of feed tubes to the subsequent processing station. Each of the feed tubes of the pair of feed tubes includes an entry port, with one of the entry ports being aligned with the male mold half and the other one of the entry ports being aligned with the female mold half arranged in the removal station. Each of the transfer nozzles of the pair of feed tubes is arranged in side by side configuration when viewed in the direction of advancement of the receptacles and is aligned with a respective one of the inlets of the receptacles. Generally, the contact lens can adhere either to the male mold half or to the female mold half of one mold after the mold has been opened The simultaneous arrangement of the male mold half of a preceding mold and of the female mold half of a subsequent mold (or vice versa) together with the side by side arrangement of the pair of transfer nozzles aligned with the inlets of the receptacles is particularly advantageous in that exactly one contact lens is always introduced into each specific receptacle (except for cases where a receptacle must be skipped). Either the contact lens is transferred into the specific receptacle during the transfer from the female mold half of one mold (in case it adheres to the female mold half), or it is transferred from the male mold half of the same mold which arrives in the removal station only in the next cycle (in case it adheres to the male mold half). In that next cycle, however, the receptacles have moved one position further, so that the transfer nozzle of the feed tube coming from the male mold half of the same mold is now arranged aligned with the inlet of that specific receptacle which has been aligned with the transfer nozzle of the female mold half of the same mold during the preceding cycle. Accordingly, in case the contact lens has already been transferred into a specific receptacle from the female mold half (since it adheres to the female mold half) it cannot be transferred into the same specific receptacle from the male mold half of the same mold, since the contact lens can only adhere to either the male or to the female mold half, but not to both. Or the other way round: In case no transfer has occurred from the female mold half during the preceding cycle (since the contact lens adheres to the male mold half), then the lens is transferred into the specific receptacle during the next cycle. Through application of the fluid simultaneously to both mold halves, it can be ascertained that the contact lens is lifted off from the respective mold half in any event. The contact lens (if there is any which adheres to that mold half to which fluid is applied) is then transported through only one feed tube of the pair of feed tubes.

In a further embodiment of the method, a distance between the pair of transfer nozzles of the pair of feed tubes may be altered automatically, based upon a detection of the relative position of the pair of transfer nozzles with respect to the entire distance the transfer nozzles can be moved in the direction of advancement of the receptacles, and based upon a comparison of the distance the transfer nozzles are positioned away from the end of the entire distance with the distance the transfer nozzles must be capable of being moved synchronously and in the direction of advancement with the receptacle. As already mentioned, the preceding processing station (the removal station in the lens forming line) is operated at a cycle speed which is smaller than that of the subsequent processing station (the processing station of the contact lens treatment line). During operation a situation may arise in which the electronic control unit realizes, that in a second-next cycle there will be too little space left for the synchronous movement of the transfer nozzle or transfer nozzles. In case of only one transfer nozzle being provided, the electronic control unit would cause that transfer nozzle to be aligned with the second-next empty receptacle, skipping one receptacle. In case of a pair of transfer nozzles being provided, this decision would be to skip the next two receptacles in order to keep the transfer nozzles in side by side configuration. However, in order to avoid the occurrence of too many empty receptacles, the distance between the pair of transfer nozzles can be altered automatically (as described above), which may result in an increased spacing of the two transfer nozzles upon their alignment with the receptacles during one cycle such, that exactly one receptacle between the two transfer nozzles is skipped. During the next cycle, the distance between the two transfer nozzles is reduced again to the original spacing such, that the two transfer nozzles are aligned again with two consecutive receptacles. Thus, the number of skipped receptacles may be kept at a minimum.

In a further embodiment of the method, a plurality of male and female mold halves are arranged in the removal station at the same time, and a corresponding plurality of feed tubes is arranged with their inlet ports being aligned with the the plurality of male and female mold halves, respectively, for receiving contact lenses which are lifted off from the male and female mold halves. The contact lenses are transported via the feed tubes to the subsequent processing station of the contact lens treatment line, where the contact lenses are introduced into a corresponding plurality of the empty receptacles, which are arranged in consecutive lines that extend about transversely (e.g. perpendicularly) to the direction of advancement of the receptacles through the contact lens treatment line. The transfer nozzles of the plurality of feed tubes are arranged in at least one of the lines extending transversely to the direction of advancement of the receptacles. Thus, a great number of formed contact lenses which are lifted-off either from the male or the female mold halves, are transported simultaneously from the removal station of the contact lens forming line to the subsequent processing station in the contact lens treatment line.

In an embodiment of the apparatus, the transfer device includes at least one feed tube having an entry port which is aligned with a respective removal position of the objects in the preceding processing station. Each feed tube ends in a respective transfer nozzle which is arranged in the vicinity of a corresponding one of the receptacles in the subsequent processing station and which is aligned with an inlet of the corresponding receptacle for introduction of the object into the corresponding one of the receptacles. The respective transfer nozzle is mounted on a slide movably arranged in a frame in a manner such that the respective transfer nozzle is capable of being moved synchronously with and in the direction of advancement of the receptacles.

Generally, the transfer device can be embodied as any particular device suitable to perform the transfer of the object. For example, the transfer device can be a conventional gripper which may grip the object, e.g. the contact lens, at the preceding processing station and can transfer the lens into the receptacle in the subsequent processing station. However, in one particular embodiment the transfer may be performed with the aid of the afore-mentioned feed tube. By having the feed tube end in a transfer nozzle which is movably mounted in a slide as described above, a difference in the cycle speeds of the preceding processing station and the subsequent processing station may easily be compensated. The same holds for the gripper or any other suitable transfer device which must be able to follow the movement of the receptacle in case the transfer of the object occurs during movement of the receptacle. Thus, the movable transfer nozzle (or the gripper or other transfer device) functions as a synchronization buffer between the preceding processing station, which is operated at a slower cycle speed, and the subsequent processing station which is operated at a faster cycle speed. A transfer of the object may be accomplished at any time, even if the receptacles are being advanced during the time of the transfer. The transfer nozzle is aligned with the receptacle into which the object is to be fed and simply follows the movement of the receptacle in case the transfer is to occur during movement of the receptacle. The apparatus is simple in construction and may easily be integrated in a manufacturing line, in particular in a contact lens manufacturing line.

One embodiment of the apparatus further includes an electronic control unit for controlling the transfer of the objects and for controlling the movement of the transfer device or the slide on which the transfer nozzle is mounted, the electronic control unit being connected with the preceding processing station and the subsequent processing station. The electronic control unit receives information about the status of the preceding processing station as well as about that of the subsequent processing station. It controls the movement of the transfer nozzle and has information about its current position. Taking account of all this information the electronic control unit causes the required change of the position of the transfer device or the transfer nozzle (if necessary) and initiates the transfer of the object.

In a further embodiment of the apparatus the electronic control unit is configured such that it is capable of receiving signals sent by the preceding processing station indicating that a transfer of one or more of the objects is about to occur. The signals are sent a predetermined amount of time ahead of the actual transfer, preferably about 0.5 to 5 seconds ahead of the actual transfer. The electronic control further is configured to cause the transfer nozzle to be aligned with the next or second-next empty receptacle in the subsequent processing station upon receipt of the signals indicating that the transfer of the objects is about to occur. The control unit is further configured to send an enable signal to the preceding processing station after alignment of the transfer nozzle with the next or the second-next empty receptacle, whereupon the object is transferred into the next or the second-next receptacle.

In a further embodiment of the apparatus, the electronic control unit is configured such that the decision to align the transfer nozzle with the next or the second-next empty receptacle is made based upon a detection of the relative position of the slide on which the transfer nozzle is mounted with respect to the frame, and further based upon a comparison of the remaining distance the slide is away from the end of the frame with the distance the transfer nozzle must be capable of being moved synchronously with and in the direction of the advancement of the receptacle.

As mentioned, the apparatus may be used in various automated manufacturing lines for the transfer of objects between processing stations which are operated at different cycle speeds. A particularly suitable application of the apparatus is a automated manufacturing line for ophthalmic lenses, in particular contact lenses, in which the contact lenses must be transferred between two consecutive processing stations. The objects to be transferred between the two consecutive processing stations are then ophthalmic lenses, in particular contact lenses. Due to the properties of the starting materials used for making the contact lenses, the processing stations in which the contact lenses are formed from the starting materials may be operated at a slower cycle speed than the subsequent processing stations.

In a further embodiment of the apparatus the preceding processing station is a removal station of a contact lens forming line operated at the first cycle speed, in which the contact lenses are formed in contact lens molds including male and female mold halves. The male and female mold halves are arranged opened in the removal station with each formed contact lens resting on one of the male and female mold halves. The subsequent processing station to which the contact lenses are transferred is a processing station of a contact lens treatment line operated at the second cycle speed.

A still further embodiment of the apparatus also includes that the feed tubes may have fluid feed lines within the entry port to assist with lifting off the formed contact lenses of one of the male and female mold halves, respectively, by applying a fluid, to enable the transfer device to transport the contact lenses through the at least one feed tube and to introduce them into the receptacles in the contact lens treatment line. The fluid may be a gas, e.g. air, or a liquid, e.g. water.

In a further embodiment of the apparatus one or more male mold halves of one or more preceding molds and one or more female mold halves of one or more subsequent molds, or vice versa, are arranged in the removal station at the same time. The above-mentioned feed tubes with fluid feed lines may be adapted for simultaneously applying the fluid to both the male and the female mold halves arranged in the removal station at the same time. In this case, a pair of the feed tubes is arranged in the removal station such that an entry port of each of the feed tubes is aligned with the male and female mold halves arranged in the removal station to enable that each of the contact lenses is transported through one of the feed tubes of the pair of feed tubes. The transfer nozzles of the pair of the feed tubes are arranged in side by side configuration in a pair of slides arranged in the frame, and are aligned with a respective one of the inlets of the receptacles in the contact lens treatment line. As already discussed in connection with the corresponding embodiment of the method for transferring the lenses, this allows that always exactly one contact lens is introduced into each specific receptacle (except for cases where a receptacle must be skipped).

In yet a further embodiment of the apparatus the slides are adapted such, that a distance between the pair of transfer nozzles of the pair of feed tubes may be altered automatically, based upon a detection of the relative position of the pair of transfer nozzles with respect to the entire distance the transfer nozzles can be moved in the direction of advancement of the receptacles, and based upon a comparison of the remaining distance the slide is positioned away from the end of the frame with the distance the transfer nozzle must be capable of being moved synchronously with and in the direction parallel to the advancement of the receptacle during the next cycle. As already mentioned when discussing the advantages of the corresponding method, the number of skipped receptacles may thus be kept at a minimum.

Still a further embodiment of the apparatus includes a plurality of the male and female mold halves arranged in the removal station of the contact lens forming line at the same time. This embodiment of the apparatus further includes a corresponding plurality of the feed tubes being arranged with their inlet ports aligned with the plurality of male and female mold halves, respectively, for receiving contact lenses which are lifted off of the male and/or female mold halves. The contact lenses are transported through the feed tubes to the contact lens treatment line, where the contact lenses are introduced into a corresponding plurality of the receptacles. These receptacles are arranged in consecutive lines that extend transversely (e.g. perpendicularly) to the direction of advancement of the receptacles through the contact lens treatment line, and the transfer nozzles of the plurality of feed tubes are arranged in at least one of the consecutive lines extending transversely to the direction of the advancement of the receptacles. Thus, a great number of formed contact lenses which are lifted-off either from the male or the female mold halves, are transported simultaneously from the removal station of the contact lens forming line to the subsequent processing station in the contact lens treatment line.

Turning to the figures, FIG. 1 shows an embodiment of an apparatus in accordance with the invention, which is generally designated with reference numeral 11. The apparatus 11 (that part of the apparatus shown in FIG. 1) is arranged in a subsequent processing station of an arrangement of two consecutive processing stations. In this embodiment, the subsequent processing station is a processing station of a contact lens treatment line of a manufacturing line for the mass production of contact lenses. By way of example, the contact lenses contained in receptacles 1-10 (1,2,3,4,5,6,7,8,9,10) are immersed in one or more liquids in order to take out the extractables from the contact lenses. The receptacles are transported stepwise with a predetermined cycle speed.

In the embodiment described here, the preceding processing station is a removal station (not shown) of a contact lens forming line. In the removal station, the contact lens molds are arranged opened. The contact lenses rest on either the male or the female mold half of the respective molds and are removed from the male and female mold halves in the removal station. The cycle speed in the contact lens forming line and thus the cycle speed in the removal station—in the following designated "first cycle speed" is slower than the cycle speed in the contact lens treatment line—in the following called "second cycle speed".

In the contact lens treatment line the contact lenses are transported automatically stepwise with the second cycle speed. The contact lenses are individually accommodated in the respective receptacles 1-10, which are capable of enabling a flow of treatment liquid into and out of the receptacles. With each cycle step the receptacles 1-10 are transported one position further (in FIG. 1 to the right), these positions being indicated in FIG. 1 with capital letters A-K. It is to be noted, however, that the number of positions depicted in FIG. 1 is only exemplary.

As mentioned, the apparatus for transferring the contact lenses from the preceding processing station (removal station of the lens forming line) to the receptacles 1-10 of the subsequent processing station (of the contact lens treatment line) is generally designated with reference numeral 11. The apparatus 11 includes a transfer device which may be, for example, a conventional lens gripper or, as depicted in the Figure flexible feed tubes 12,13, forming a pair of feed tubes, the entry ports of which are aligned with respective male and female mold halves of opened contact lens mold arranged in the preceding processing station (the removal station, not shown). The other ends of the flexible tubes 12,13 are connected to transfer nozzles 14,15 which are mounted on slides 16,17. Slides 16,17 are movably arranged in a frame 19 which extends parallel to a direction of advancement of the receptacles 1-10 in the subsequent processing station of the contact lens treatment line. The transfer nozzles 14,15 are in alignment with two receptacles 4,5 at positions D and E, and are capable of being moved synchronously with and in the direction of advancement of the receptacles 4,5 if these are advanced to the right during the transfer of the contact lens. Thus, in case such advancement of the receptacles occurs during transfer of a contact lens, the end position of the two receptacles after advancement would be E and F. Once the contact lens has been transferred into the receptacles which would then be at positions E and F, the transfer nozzles 14,15 are lifted and returned to the left to be aligned with the next two empty receptacles 2,3 which after advancement are located at positions C and D. In case that the distance of the right slide 17 to the end 19 of the frame 18 is smaller than the distance the receptacles are moved to the right during synchronous advancement, the two slides 16,17 are moved at least one position farther to the left, thus skipping at least one position and sparing at least one receptacle which is left empty.

An electronic control unit (not shown) is provided for the control of the movement of the transfer nozzles 14,15 mounted on the slides 16,17. The electronic control unit is connected with the preceding processing station (removal station of the lens forming line) and with the subsequent processing station (of the contact lens treatment line) and is capable of communicating with the processing stations. It controls the alignment of the transfer nozzles 14,15 with the receptacles 1-10 and the movement of the transfer nozzles 14,15 within the frame 18 synchronously with the advancement of the receptacles.

The electronic control unit may be configured such that upon receiving a signal from the preceding processing station (removal station of the lens forming line) that a transfer of one or more objects is about to occur, a predetermined amount of time ahead of (i.e., prior to) the actual transfer. This predetermined amount of time can be within the range of 0.5 to 5 seconds, and in particular may be about one second. The electronic control unit causes the transfer nozzles 14,15 to be aligned with empty receptacles in the subsequent processing station (of the contact lens treatment line). After alignment has been completed, the electronic control unit sends an enable signal to the preceding processing station (removal station of the lens forming line) whereupon the contact lens is transferred into one of the receptacles. In case the receptacles are advanced during the transfer of the contact lens, the electronic control unit controls movement of the transfer nozzles 14,15 within frame 18 such that transfer nozzles 14,15 are moved synchronously with the receptacles 1-10.

In addition, the electronic control unit may be configured such that its alignment control of the transfer nozzles 14,15 with the next empty receptacles is decided based upon a detection of the relative position of the slides 16,17 on which the transfer nozzles 14,15 are mounted with respect to the frame 18, and further based upon a comparison of the remaining distance to the end 19 of the frame with the distance the slides 16,17 are away from the end 19 of the frame, with the distance the transfer nozzles 14,15 must be capable of being advanced synchronously with the receptacles. Thus, it is ensured that the transfer nozzles 14,15 can follow the receptacles synchronously during the transfer of the object should such transfer occur during advancement of the receptacles.

In the embodiment depicted in FIG. 1 two flexible feed tubes 12,13 are provided. The number of two feed tubes takes into account that each contact lens mold includes two mold halves, a male and a female mold half. After the mold has been opened, it cannot absolutely reliably be predicted whether the formed contact lens adheres to the molding surface of the male mold half or of the female mold half. Accordingly, two feed tubes 12,13 are provided the entry ports of which are aligned with the positions of the male and female mold halves, respectively. However, in one advantageous embodiment it is the male mold half of a preceding mold and the female mold half of a subsequent mold which are arranged in the removal station at the same time. Within the entry ports of the feed tubes, a fluid feed line may be provided, such that a liquid or gaseous fluid such as, for example, water or air, may then applied simultaneously to lift-off the contact lens from either the male or the female mold half. The lifted-off contact lens is then transported through the respective feed tube 12,13 and transferred to the receptacles 4,5 in the contact lens treatment line, which are in alignment with the transfer nozzles 14,15. One example of a method and device for lifting-off and removing contact lenses from the mold halves is described in more detail in US-2008/0240890 A1, which is incorporated herein by reference.

As has been pointed out it is advantageous that the male mold half of a preceding mold and the female mold half of a subsequent mold, or vice versa, are arranged in the removal station at the same time. For the sake of simplicity, the following explanation is given with the aid of FIG. 1. Let us assume that the entry port of feed tube 13 is arranged in the removal station to be aligned with the male mold half of a preceding mold and the entry port of feed tube 12 is arranged in the removal station to be aligned with the female mold half of a subsequent mold. Accordingly, transfer nozzle 15 is aligned with receptacle 5 at position E in FIG. 1 while transfer nozzle 14 is aligned with receptacle 4 at position D in FIG. 1. As mentioned, once a mold has been opened the contact lens can adhere either to the female or to the male mold half of one and the same mold, but not to both of them at the same time. Let us further assume, that the contact lens adheres to the female mold half of the subsequent mold. This contact lens is transferred into receptacle 4 at position D. After the transfer has been completed, the receptacles move one position to the right so that during the next cycle receptacle 4 is at position E in FIG. 1. During this next cycle, the male mold half of the same mold arrives at the removal station, so that the entry port of feed tube 13 is aligned with that male mold half. However, since the contact lens of this mold half has adhered to the female mold half it is impossible that it adheres to the male mold half of the same mold. Accordingly, during this cycle no contact lens is transferred through feed tube 13 and transfer nozzle 15 into receptacle 4 which is now at position E (there is already a contact lens contained in receptacle 4 from the transfer during the previous cycle). This does also work the other way round, that is to say in case the contact lens adheres to the male mold half of a mold. In this case, no transfer from the female mold half occurs and instead the transfer is performed from the male mold half during the next cycle. As a result, after the transfers from the male and female mold halves from one and the same mold has been completed there is always one contact lens contained in each receptacle (assuming that no receptacle has to be skipped).

It is to be noted, however, that generally the transfer of the contact lens can also be accomplished with only one feed tube. For that purpose the fluid is applied successively to the male and the female mold halves which, for that purpose, are advanced stepwise to the position of the entry port of the only feed tube. The fluid or the fluid together with the lifted-off contact lens are successively transported to the subsequent processing station in the contact lens treatment line. In that embodiment the only feed tube ends in only one transfer nozzle which is mounted on a slide which is movably installed in the frame.

Figure 3:
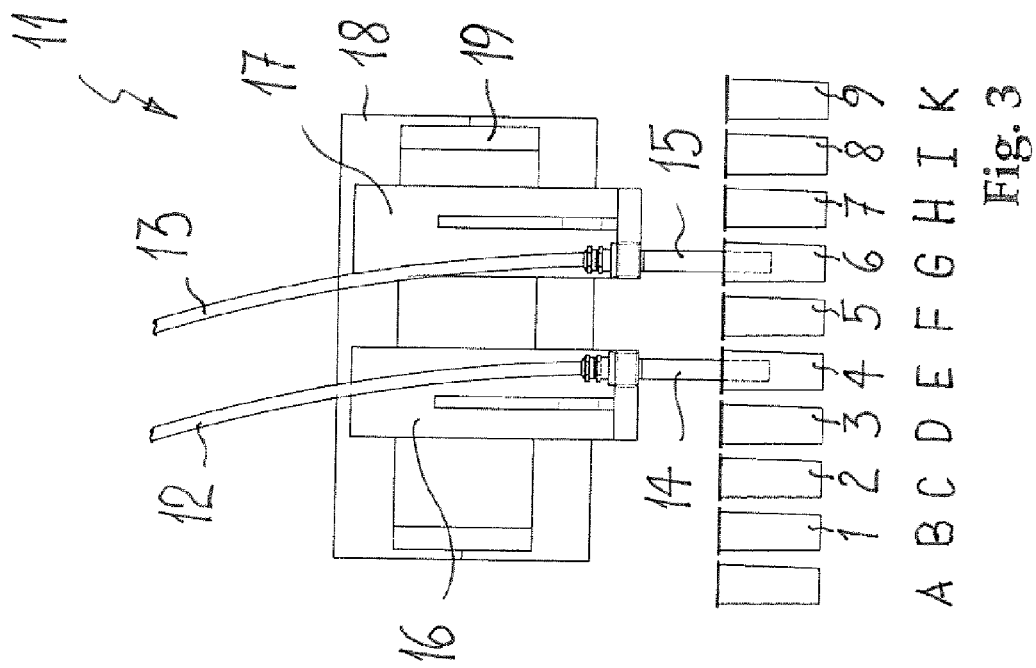
FIG. 3 is a side view of the device of FIG. 2 after synchronous movement together with corresponding receptacles.
Figure 2:
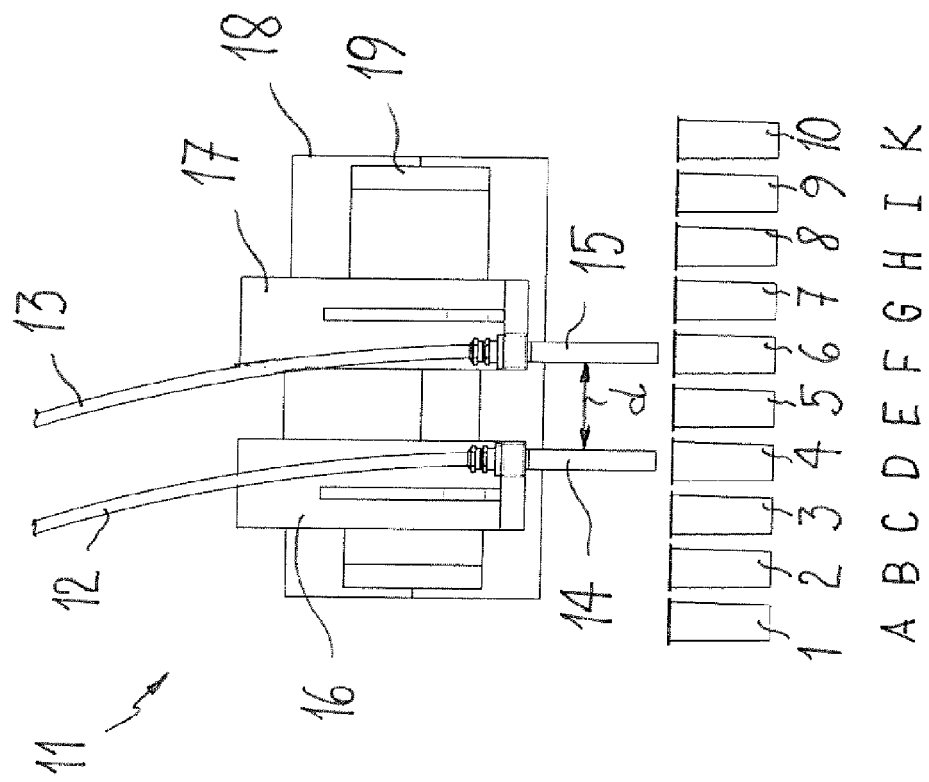
FIG. 2 is a side view of a second embodiment of the device according to the invention.

In FIGS. 2 and 3 another embodiment is shown, which allows an easy optimization of the number of skipped receptacles in the subsequent processing station in the contact lens treatment line. In the drawings like reference numerals designate like elements and components as in FIG. 1. The apparatus for transferring the contact lenses from the preceding processing station (removal station of the lens forming line) to the receptacles 1-10 of the subsequent processing station (in the contact lens treatment line) is again generally designated with reference numeral 11. The apparatus 11 as shown in FIGS. 2 and 3 includes two flexible feed tubes 12,13, whose entry portions at the preceding processing station (removal station) are aligned with respective male and female mold halves of an opened contact lens mold (not shown). The other ends of the flexible tubes 12,13 are connected to transfer nozzles 14,15 which are mounted on slides 16,17. The slides 16,17 are movably arranged in a frame 19, similar to FIG. 1.

FIG. 2 shows the transfer nozzles 14,15 in alignment with two receptacles 4,6 at positions D,F. In comparison to FIG. 1 the transfer nozzles 14,15 are spaced a distance d from each other. The distance d is selected such, that exactly one receptacle 5 (in FIG. 2 at position E) is skipped. Assuming that the transfer of the contact lens occurs during advancement of the receptacles 1-10 to the right, the transfer nozzles 14,15 are moved synchronously with the receptacles 4,6 one position to the right. Thus, as is shown in FIG. 3, after advancement the receptacles 4,6 are at positions E,G. After the contact lens has been transferred the transfer nozzles 14,15 are lifted again and the slides 16,17 are moved in frame 18 to the left to align with receptacles 2,3, thereby reducing the distance between the two transfer nozzles 14,15 again to their initial distance. By having the option to alter the distance between the transfer nozzles 14,15, the number of receptacles which must be skipped in order to ascertain a synchronous movement of the transfer nozzles with the receptacles can be optimized. This optimization is accomplished by the electronic control unit (not shown) taking into account the actual position of the slides 16, 17 and the distance to the end 19 of the frame 18.

In FIGS. 1-3 only individual feed tubes 12,13, transfer nozzles 14,15 and receptacles 1-10 are shown. It must be noted though, that in the automatic mass production of ophthalmic lenses, in particular contact lenses, usually a number of contact lens molds are provided at the same time in the removal station of the lens forming line. These contact lens molds may be arranged in lines extending transversely to the direction of advancement. Consequently, there are provided corresponding numbers of lines of feed tubes in which corresponding numbers of feed tubes are arranged transversely to the direction of advancement of consecutive lines of receptacles in the subsequent processing station in the contact lens treatment line. Thus, reference numerals 12,13 also stand for two lines of feed tubes which end in two lines of transfer nozzles 14,15 which are mounted on slides 16,17, which are movably installed in frame 18. Receptacles 1-10 also stand for consecutive lines of receptacles which extend transversely to the direction of advancement along positions A-K through the subsequent processing station in the contact lens treatment line. Thus, the described method of transfer of contact lenses from a preceding processing station (removal station of the lens forming line) to a subsequent processing station (of the contact lens treatment line) occurs simultaneously along lines of feed tubes into lines of receptacles.

The invention has been described with reference to the transfer of contact lenses from a preceding processing station embodied as a removal station of a contact lens forming line to a subsequent processing station of a contact lens treatment line. It should be noted, however, that the method and device for the transfer of objects from a preceding to a subsequent of two consecutive processing stations may be applied also to other processes and objects, the required modifications therefore, being well within the skill of the artisan. Therefore, the scope of protection is not intended to be limited to the field of ophthalmic lenses or contact lenses, but rather is defined by the appended claims.

The invention claimed is:

1. An apparatus for transferring contact lenses between two consecutive processing stations being operated at different cycle speeds, said apparatus comprising:
a transfer device having a fluid means to transport the removed contact lenses from a preceding processing station having a first cycle speed to a subsequent processing station of said two consecutive processing stations and for introducing them into a plurality of receptacles consecutively arranged in said subsequent processing station, said receptacles being advanced through said subsequent processing station with a second cycle speed faster than said first cycle speed, said transfer device is moved synchronously with and in the direction of advancement of said receptacles in said subsequent processing station,
wherein said preceding processing station is a removal station of a contact lens forming line operated, in which contact lenses are in contact lens molds comprising male and female mold halves arranged opened in said removal station with each contact lens resting on one of said male and female mold halves of a respective mold, and wherein said subsequent processing station to which said contact lenses are transferred is a processing station of a contact lens treatment line,
said transfer device further comprising at least two feed tubes each having an entry port which is aligned with a respective removal position of said contact lenses in said preceding processing station, each feed tube ending in a respective transfer nozzle which is arranged in the vicinity of a corresponding one of said receptacles in said subsequent processing station and which is aligned with an inlet of said corresponding receptacle for introduction of said contact lens into said corresponding one of said receptacles, said respective transfer nozzle being mounted on a slide movably arranged in a frame in a manner such that said respective transfer nozzle is moved synchronously with and in the direction of advancement of said receptacles.

2. The apparatus according to claim 1, further comprising an electronic control unit for controlling the transfer of said contact lenses and for controlling said movement of said transfer device or said slide on which said transfer nozzle is mounted, respectively, said electronic control unit being connected with said preceding processing station and said subsequent processing station.

3. The apparatus according to claim 2, wherein said electronic control unit is configured such that it is capable of receiving signals sent by said preceding processing station indicating that a transfer of one or more of said contact lenses is about to occur, said signals being sent a predetermined amount of time of about 0.5 to 5 seconds ahead of the actual transfer, said electronic control further being configured to cause said transfer nozzle to be aligned with the next or second-next empty receptacle in said subsequent processing station upon receipt of said signals indicating that said transfer of said contact lenses is about to occur, and wherein said control unit is further configured to send an enable signal to said preceding processing station after alignment of said transfer nozzle with said next or said second-next empty receptacle, whereupon said contact lens is transferred into said next or said second-next receptacle.

4. The apparatus according to claim 3, wherein said electronic control unit is configured such that said decision to align said transfer nozzle with said next or said second-next empty receptacle is made based upon a detection of the relative position of said slide on which said transfer nozzle is mounted with respect to said frame, and based upon a comparison of the remaining distance the slide is away from the end of said frame.

5. The apparatus according to claim 1, wherein each said feed tube comprises a fluid feed line located within said entry port to provide fluid to said formed contact lenses of one of said male and female mold halves, respectively, to enable the transfer device to lift said contact lenses from said mold halves and transport said contact lenses through said feed tube and to introduce said contact lenses into said receptacles in said contact lens treatment line.

6. The apparatus according to claim 5, wherein a said male mold half of a preceding one of said molds and a said female mold half of a subsequent one of said molds, are arranged in said removal station at the same time, and wherein said feed tubes comprising fluid feed lines are adapted for simultaneously applying said fluid to both said male and said female mold halves arranged in said removal station, and wherein a pair of said feed tubes is arranged in said removal station such that said entry port of each of said feed tubes is aligned with said male and female mold halves arranged in said removal station to enable that each of said contact lenses is transported through one of said feed tubes of said pair of feed tubes to said transfer nozzles, said transfer nozzles of said pair of said feed tubes being arranged in side by side configuration in a pair of said slides arranged in said frame, and being aligned with a respective one of said inlets of said receptacles in said contact lens treatment line.

7. The apparatus according to claim 6, wherein said slides are adapted such, that a distance (d) between said pair of transfer nozzles of said pair of feed tubes may be altered automatically, based upon a detection of the relative position of said pair of transfer nozzles with respect to the entire distance said transfer nozzles can be moved in said direction of advancement of said receptacles, and based upon a comparison of the remaining distance the slide is positioned away from the end of said frame with the distance said transfer nozzle must be capable of being moved synchronously with and in said direction parallel to said advancement of said receptacle during the next cycle.

8. Apparatus according to claim 7, comprising a plurality of said male and female mold halves arranged in said removal station of said contact lens forming line at the same time, further comprising a corresponding plurality of said feed tubes being arranged with their entry ports aligned with said plurality of said male and female mold halves, respectively, for receiving contact lenses which are lifted off of said male and/or female mold halves, said contact lenses being transported through said feed tubes to said contact lens treatment line, where said contact lenses are introduced into a corresponding plurality of said receptacles, which are arranged in consecutive lines that extend transversely to the direction of advancement of said receptacles through said contact lens treatment line, said transfer nozzles of said plurality of feed tubes being arranged in at least one of said consecutive lines extending transversely to the direction of said advancement of said receptacles.

* * * * *